United States Patent [19]
Nagayama

[11] Patent Number: 6,059,432
[45] Date of Patent: May 9, 2000

[54] INJECTION MOLDED VEHICLE LAMP AND METHOD OF MAKING

[75] Inventor: Satoru Nagayama, Shizuoka, Japan

[73] Assignee: Koito Manufacturing Co., Ltd., Tokyo, Japan

[21] Appl. No.: 09/030,806

[22] Filed: Feb. 26, 1998

[30] Foreign Application Priority Data

Feb. 28, 1997 [JP] Japan ................................... 9-061790

[51] Int. Cl.$^7$ .................................................. B60Q 1/04
[52] U.S. Cl. .......................... 362/507; 362/362; 362/514; 362/546
[58] Field of Search ...................................... 362/459, 496, 362/505, 543, 549, 487, 507, 514; 264/328.1

[56] References Cited

U.S. PATENT DOCUMENTS

| | | | |
|---|---|---|---|
| 4,807,775 | 2/1989 | Sorensen | 220/72 |
| 4,895,693 | 1/1990 | Suzuki et al. | 362/61 |
| 5,001,610 | 3/1991 | Otaka | 362/61 |
| 5,209,558 | 5/1993 | Suzuki et al. | 362/66 |
| 5,390,088 | 2/1995 | Tsukada | 362/61 |
| 5,546,285 | 8/1996 | Takikawa et al. | 362/61 |
| 5,552,969 | 9/1996 | Murakami | 362/61 |
| 5,552,970 | 9/1996 | Takezawa et al. | 362/61 |

*Primary Examiner*—Sandra O'Shea
*Assistant Examiner*—Ismael Negron
*Attorney, Agent, or Firm*—Morgan, Lewis & Bockius LLP

[57] ABSTRACT

A vehicle lamp includes an injection-molded lamp body having a wall surface portion of substantially uniform thickness, and a gate mark and a rib extending along the wall surface portion from the gate mark, each formed in the wall surface portion of the lamp body.

20 Claims, 4 Drawing Sheets

6,059,432

INJECTION MOLDED VEHICLE LAMP AND METHOD OF MAKING

This application claims the benefit of Japanese patent Application No. Hei. 9-61790, filed Feb. 28, 1997, which is hereby incorporated by reference.

BACKGROUND OF THE INVENTION

1. Field of the Invention

The present invention relates to a vehicle lamp having an injection-molded lamp body.

2. Discussion of the Related Art

A lamp body of a vehicle lamp is generally formed by injection molding. To reduce weight and cost, it is preferable to form the lamp body as thin as possible. Therefore, the lamp body is usually formed with a wall surface portion of the lamp body having a substantially uniform thickness.

In a large vehicle lamp, however, the lamp body also becomes fairly large. In molds used for injection-molding the lamp body, molten resin cannot be spread to every corner in a cavity, so that failures in injection-molding, such as surface sinkage, nesting, etc., frequently occur.

To prevent such failures, molds having a plurality of gates are usually employed. These molds, however, have complicated structures, and are expensive because of complex machining involved. Particularly when molds use a hot runner, a plurality of hot tips are required corresponding to each of the gates. Accordingly, the cost of the molds is very high.

SUMMARY OF THE INVENTION

Accordingly, the present invention is directed to a vehicle lamp that substantially obviates one or more of the problems and limitations of the related art.

An object of the present invention is to provide a vehicle lamp having a lamp body in which failures in injection-molding can be reduced without increasing the cost of molds.

Additional features and advantages of the present invention will be set forth in the description which follows, and will be apparent from the description, or may be learned by practice of the invention. The objectives and other advantages of the invention will be realized and attained by the structure and process particularly pointed out in the written description as well as in the appended claims.

To achieve these and other advantages and in accordance with the purpose of the present invention, as embodied and broadly described, in accordance with a first aspect of the present invention there is provided a vehicle lamp, including an injection-molded lamp body having a wall surface portion of substantially uniform thickness, and a gate mark and a rib extending along the wall surface portion from the gate mark, each formed in the wall surface portion of the lamp body.

In another aspect of the present invention, there is provided a vehicle lamp, including an injection-molded lamp body having a wall surface portion of substantially uniform thickness; and a gate mark and a rib extending along the wall surface portion from the gate mark, each formed in the wall surface portion of the lamp body, wherein an opening portion for attachment of a light bulb is formed in the wall surface portion, and wherein an end portion of the rib surrounds the opening portion.

In another aspect of the present invention, there is provided a vehicle lamp, including an injection-molded lamp body having a wall surface portion of substantially uniform thickness, and a gate mark and a rib extending along the wall surface portion from the gate mark, each formed in the wall surface portion of the lamp body, wherein an opening portion for attachment of a light bulb is formed in the wall surface portion, wherein an end portion of the rib surrounds the opening portion, wherein a height of the rib is not smaller than a thickness of the wall surface portion, wherein the wall surface portion includes a first wall surface portion located on a front side relative to a direction of releasing of a mold, and a second wall surface portion located in a rear side relative to the direction of releasing of the mold, wherein the gate mark is formed in the first wall surface portion, and wherein the rib extends from the first wall surface portion to the second wall surface portion.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention that together with the description serve to explain principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 1:
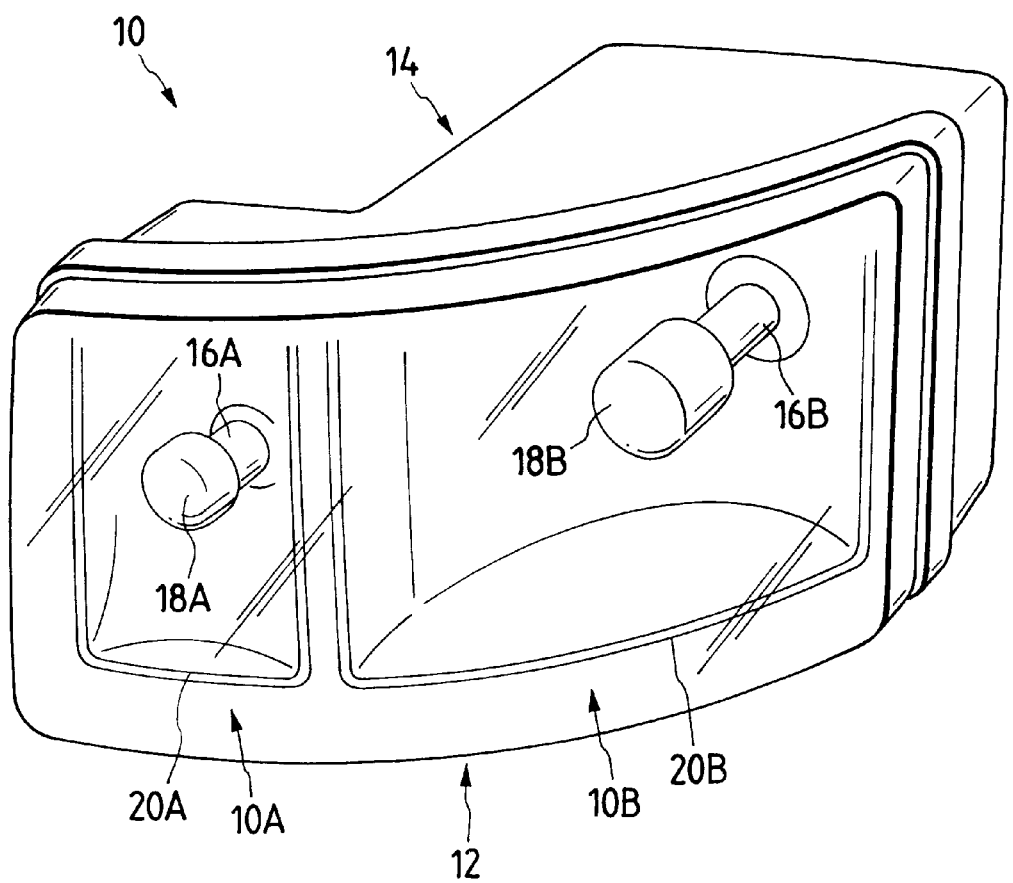
FIG. 1 is a perspective view showing a vehicle lamp according to a preferred embodiment of the present invention.
Figure 2:
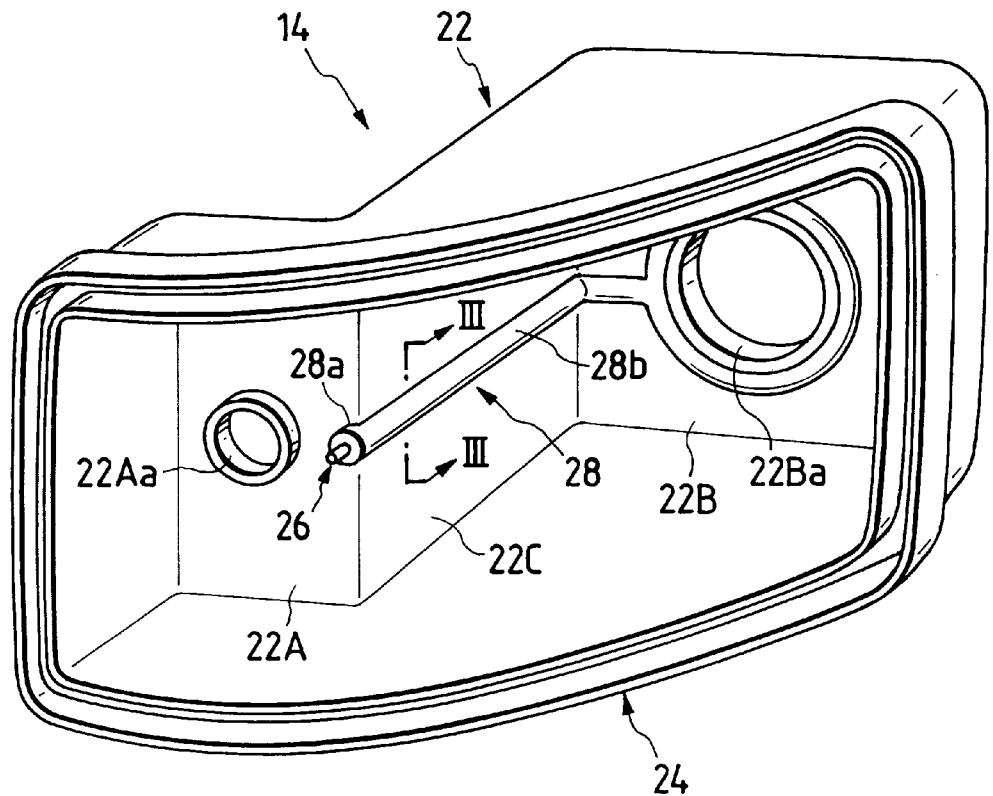
FIG. 2 is a perspective view showing a lamp body.
Figure 3:
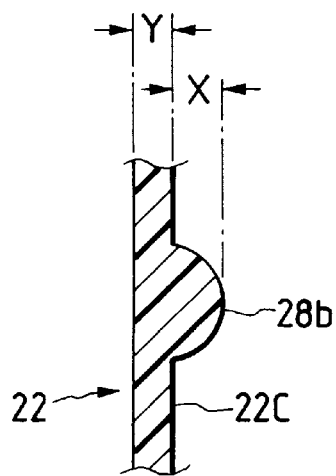
FIG. 3 is a sectional view along line III—III of FIG. 2.

FIG. 1 shows a perspective view of a vehicle lamp of the present invention; FIG. 2 is a perspective view showing a lamp body; and FIG. 3 is a sectional view along line III—III of FIG. 2.

As shown in FIG. 1, a lamp 10 is a head lamp for a left front portion of a vehicle body. A first lamp chamber 10A and a second lamp chamber 10B are adjacent to each other and are defined by a lens 12 and a lamp body 14 located behind the lens 12.

Reflectors 20A and 20B are provided in the lamp chambers 10A and 10B, respectively, and light bulbs 16A and 16B and shades 18A and 18B are attached to the reflectors 20A and 20B, respectively. The shades 18A and 18B are in front of the light bulbs 16A and 16B, respectively. The reflectors 20A and 20B are tiltably supported by the lamp body 14.

The lens 12 inclines backward and outward in a direction across the vehicle. The reflector 20B of the second lamp chamber 10B is wider and deeper compared to the reflector 20A of the first lamp chamber 10A.

As shown in FIG. 2, the lamp body 14 is injection-molded out of resin and includes a wall surface portion 22 serving as a back wall of the first and second lamp chambers 10A and 10B, and an outer circumferential groove portion 24 for securing an outer circumferential edge portion of the lens 12. The wall surface portion 22 and the outer circumferential groove portion 24 have substantially uniform thicknesses.

The wall surface portion 22 has a rear wall surface portion 22B in the second lamp chamber 10B located generally backward compared to a rear wall surface portion 22A in the first lamp chamber 10A because of the lateral inclination of the lens 12 and the size proportions of the reflectors 20A and 20B. Further, the two rear wall surface portions 22A and 22B are connected to each other through an intermediate wall surface portion 22C extending forward and backward.

An opening portion 22Aa, for attaching a relatively small bulb 16A, is formed in the rear wall surface portion 22A. An opening portion 22Ba, for attaching a relatively large bulb 18A, is formed in the rear wall surface portion 22B. A gate mark 26, formed of a resin remaining in a gate 110 (described below) during injection-molding of the lamp body 14, is formed as a pin-shape in an inner surface of a corner portion in the rear wall surface portion 22A on the intermediate wall surface portion 22C. Further, a rib 28, extending from the gate mark 26 to the rear wall surface portion 22B through the intermediate wall surface portion 22C, is formed in the wall surface portion 22, expanding on the inside of the wall surface portion 22.

The rib 28 is formed as a columnar boss portion 28a in a connecting portion between the gate mark 26 and the inner surface of the corner portion of the rear wall surface portion 22A. The rib 28 also is formed as a sectionally semicircular rib body 28b on the respective inner surfaces of the intermediate wall surface portion 22C and the rear wall surface portion 22B, such that a part of the boss portion 28a extends forward. As shown in FIG. 3, the height X of the rib body 28b is larger than the thickness Y of the wall surface portion 22.

As shown in FIG. 2 and FIG. 3, the rib body 28b extends straight backward in the inner surface of the intermediate wall surface portion 22C and extends straight outward in the direction of the vehicle width in the inner surface of the rear wall surface portion 22B. The end portion of the rib body 28b is formed annularly surrounding the bulb attachment opening portion 22Ba.

Figure 4:
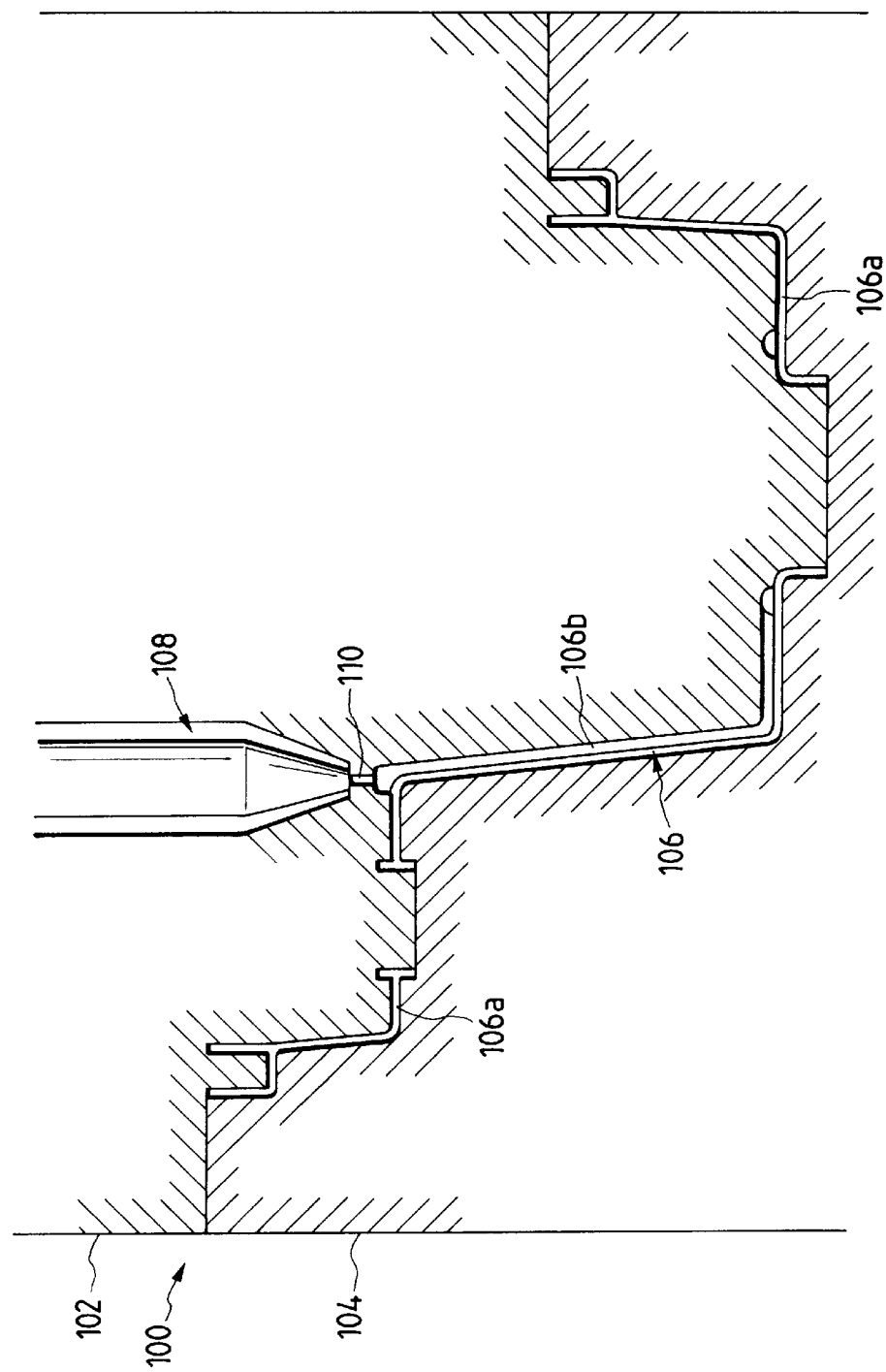
FIG. 4 is a side sectional view showing molds for injection-molding the lamp body.

FIG. 4 is a side sectional view showing a mold 100 for injection-molding the lamp body 14. The mold 100 has a hot runner. A cavity 106 corresponding to a shape of the lamp body 14 is formed between a fixed mold 102 and a movable mold 104. A hot tip 108 for heat-retaining the molten resin to prevent its solidification before injection is provided in the fixed mold 102. The gate 110 is formed in the forward end portion of the hot tip 108 connecting with the cavity 106.

A portion 106a of the cavity 106 is used for forming a general portion of the wall surface portion 22 and an outer circumferential groove portion 24 in the lamp body 14 having a substantially constant thickness because the wall surface portion 22 and the outer circumferential groove portion 26 have a substantially uniform thickness, whereas a portion 106b for forming the rib 28 has a partially widened thickness.

Figure 5:
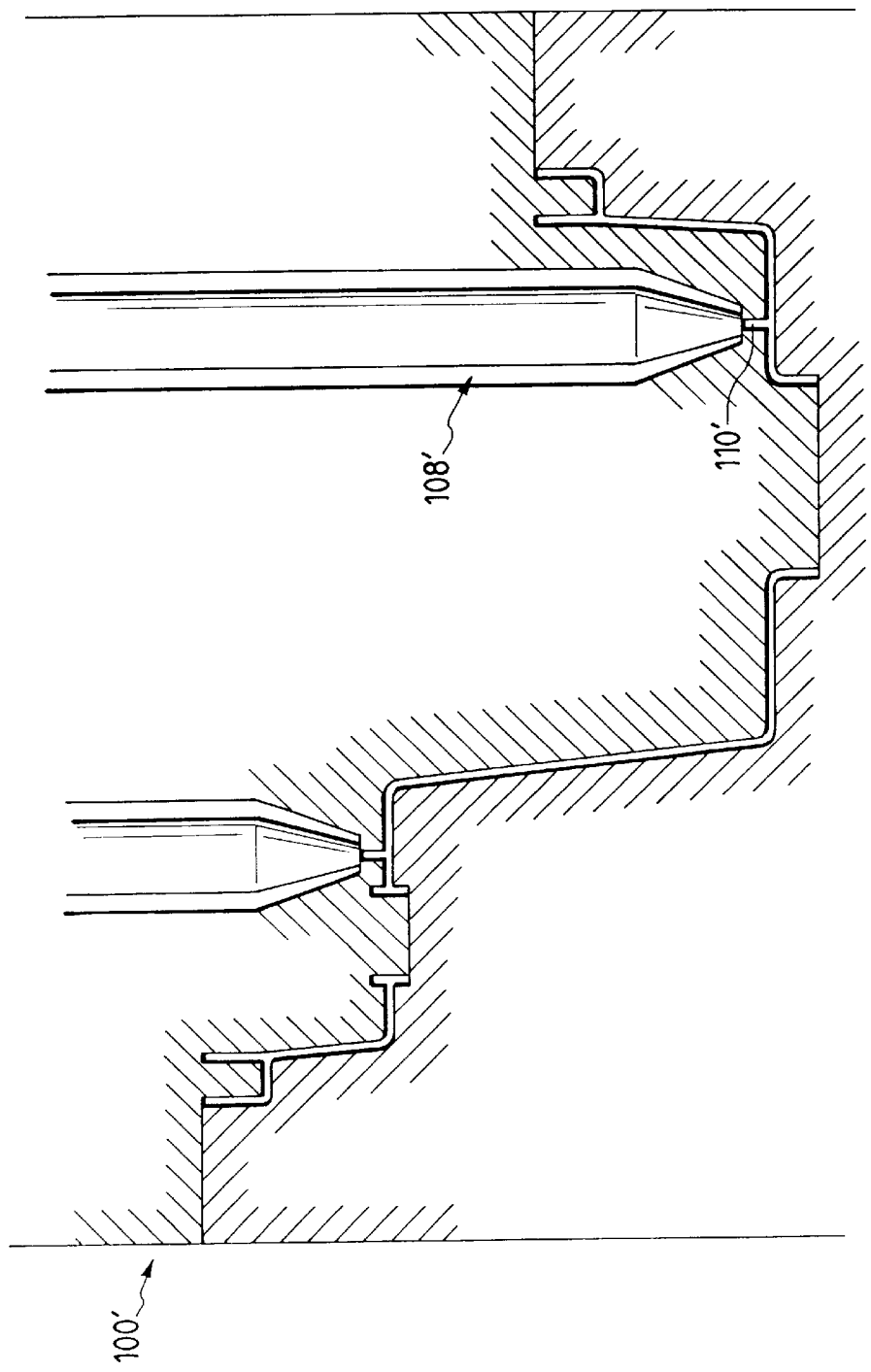
FIG. 5 shows conventional molds.

The gate mark 26 created at the time of injection molding and the rib 28 extending from the gate mark 26 are formed in the substantially uniform thick wall surface portion 22. That is, a large part of the molten resin injected from the gate 110 into the cavity 106 flows in the portion 106b to form the rib 28, which has a relatively large sectional area, before the remainder of the molten resin flows in the portion 106a to form the general portion of the wall surface portion 22. As described above, the mold 100 and portion 106b that functions as a path for the molten resin are designed so that the length of flow of the molten resin is long compared to the conventional mold 100' in which the rib 28 is not formed, as shown in FIG. 5. Accordingly, the molten resin can easily spread to every corner in the cavity 106. As a result, the lamp body 14 can be formed with no defects due to molding even if the number of gates 110 is reduced compared with the conventional mold 100'.

Accordingly, occurrences of failures in molding can be reduced without increasing the cost of the molds.

Further, the presence of the rib 28 improves the fluidity of the molten resin during injection molding. Accordingly, the thickness of the wall surface portion 22 can be reduced. Furthermore, improvement in the strength of the lamp body 14 can be attained by forming the rib 28 in the wall surface portion 22.

Also, the wall surface portion 22 includes two stages (front and rear) so that the gate mark 26 is formed in the rear wall surface portion 22A located in front relative to the direction of releasing of the molds, whereas the opening portion 22Ba for attaching a relatively large bulb is formed in the rear wall surface portion 22B, which is located in the rear side. Accordingly, it is generally difficult to spread high-temperature molten resin to the rear portion of the bulb-attachment opening portion 22Ba located far from the gate 110 in the cavity 106 when the molten resin is injected into the cavity 106.

Therefore, the conventional mold 100' shown in FIG. 5 is designed so that a gate 110' is formed in a portion used for forming the rear wall surface portion 22B located in the rear side. In this case, not only is it necessary to machine the gate 110', but an additional hot tip 108' is required with the addition of the gate 110', and the cost of the mold 100' becomes very high.

The rib 28 extending from the gate mark 26 to the rear wall surface portion 22B through the intermediate wall surface portion 22C has an end portion formed annularly to surround the bulb-attachment opening portion 22Ba and is formed in the wall surface portion 22. Accordingly, the high-temperature molten resin can be spread to the rear portion of the bulb-attachment opening portion 22Ba in the cavity 106. As a result, occurrences of failures in molding can be effectively reduced.

Furthermore, because the rib 28 is expanding toward the inner surface of the wall surface portion 22, the formation of the rib 28 does not hinder provision of items, such as structures for attachment of the lamp 10 to the vehicle body, aiming mechanisms, etc., in the outer surface side of the lamp body 14.

Further, because the rib body 28b of the rib 28 has a substantially circular arc-like sectional shape and because the height X of the rib body 28b is larger than the thickness Y of the wall surface portion 22, a path for the molten resin to easily flow through exists in the cavity 106.

Furthermore, because the gate mark 26 is formed in the corner portion in the wall surface portion 22A on the intermediate wall surface portion 22C side, the mold 100 can have the molten resin injected straight from the gate 110 into the rib-forming portion 106b. As a result, there is a path for the molten resin to flow through more easily. Furthermore, because the connection portion of the rib 28 with the gate mark 26 is formed as the columnar boss portion 28a, the injection of the molten resin from the gate 110 into the rib-forming portion 106b can occur more smoothly.

In the vehicle lamp 10 of the present invention, a gate mark 26 generated at the time of injection molding and a rib 28 extending from the gate mark 26 along a substantially uniform thick wall surface portion 22 of a lamp body 14 are formed in the wall surface portion 22.

That is, with respect to the fluidity of molten resin in the cavity 106 in the molds, a large sectional area is generally better than a small sectional area. Accordingly, a large part of molten resin injected from the gate into the cavity 106 flows in the rib-forming portion of the wall surface portion 22 in the cavity 106 before the remaining part of the molten resin flows in the general portion-forming portion of the wall surface portion 22. In the molds where the rib-forming portion functions as a path of molten resin, the length of flow of molten resin can be large compared with conventional molds, where the rib 28 is not formed, so that the molten resin can be easily spread to every corner in the cavity 106. Accordingly, the lamp body 14 can be molded without occurrence of a failure in molding even if the number of gates is reduced compared with the conventional molds.

Further, the fluidity of the molten resin at the time of injection molding is improved by the presence of the rib 28. Accordingly, the thickness of the wall surface portion 22 of the lamp body 14 can be reduced.

Furthermore, improvement in the strength of the lamp body results from the rib 28 being formed in the wall surface portion 22.

In the lamp body 14, a bulb-attachment opening portion 22Ba having a relatively large size is generally formed in the wall surface portion 22, but a weld line caused by a confluence of molten resin at the time of injection molding is formed in the surroundings of the bulb-attachment opening portion 22Ba, so that the strength of the lamp body is likely to be lowered. If the bulb-attachment opening portion 22Ba is located far from the gate mark 26, a failure in molding, such as nesting, is likely to occur in the weld line portion. This failure occurs because the temperature of molten resin has already been lowered in the rear portion of the bulb-attachment opening portion 22Ba in the cavity 106 and the fluidity of the molten resin is low.

In this case, therefore, if the end portion of the rib 28 is formed so as to surround the bulb-attachment opening portion 22Ba, high-temperature molten resin can be spread to the rear portion of the bulb-attachment opening portion 22Ba in the cavity 106. Accordingly, occurrences of failures in molding in the weld line-forming portion can be reduced.

The word "rib" is not limited to any specific shape. The rib 28 may expand toward the inner surface side of the wall surface portion 22 or it may expand toward the outer surface of the wall surface portion 22 or toward both the inner and outer surfaces of the wall surface portion 22. The word "rib" is not limited specifically so long as the rib extends over a predetermined length along the wall surface portion 22 from the gate mark 26 of the wall surface portion 22. Since structures for attaching the lamp 10 to the vehicle body, such as aiming mechanisms, are usually provided in the outer surface side of the lamp body 14, the rib 28 is preferably formed expanding toward the inner surface of the wall surface portion 22.

Further, the sectional shape of the rib 28 may be a number of sectional shapes, such as rectangular or wedge-like. The sectional shape is preferably a circular arc. The purpose of forming the rib 28 is to provide a path for the molten resin to flow easily. It is therefore preferable that the path is as thick as possible without increasing the contact area between the path and the molten resin. The substantially circular arc-like shape is therefore preferred.

Furthermore, the words "height of the rib" is not limited specifically. It is preferable, from the point of view of providing the path in which the molten resin flows easily, that the height of the rib 28 is not smaller than the thickness of the wall surface portion 22.

In a vehicle lamp 10 having two lamp chamber portions offsetting in the front and rear, the wall surface portion of the lamp body is usually formed to have first and second wall surface portions located in the front and rear sides with respect to the direction of releasing of the molds, respectively. Further, in the mold 100 for forming the lamp body 14, the gate 110 position is usually in the first-wall-surface forming portion in the mold 100 (of course, the gate mark 26 is formed in the first wall surface portion). In this case, the path in which molten resin flows easily can be secured if the rib 28 is formed extending from the first wall surface portion to the second wall surface portion.

In this case, when the bulb-attachment opening portion 22Ba is formed in the second wall surface portion, it is particularly effective that the end portion of the rib 28 is formed surrounding the bulb-attachment opening portion 22Ba because the bulb-attachment opening portion 22Ba is located so as to be far from the gate mark 26.

Further, if the gate mark 26 is formed in the second wall surface portion side corner portion of the first wall surface portion, molten resin can be injected straight from the gate to the rib-forming portion. Accordingly, a path for the molten resin to flow through more easily exists.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they came within the scope of the appended claims and their equivalents.

What is claimed is:

1. A vehicle lamp comprising:
   an injection-molded lamp body having a wall surface portion of substantially uniform thickness;
   a gate mark and a rib extending along the wall surface portion from the gate mark, each formed in the wall surface portion of the lamp body,
   wherein the gate mark is inside a rear wall of the lamp body.

2. A vehicle lamp comprising:
   an injection-molded lamp body having a wall surface portion of substantially uniform thickness; and
   a gate mark and a rib extending along the wall surface portion from the gate mark, each formed in the wall surface portion of the lamp body,
   wherein an opening portion for attachment of a light bulb is formed in the wall surface portion; and
   wherein an end portion of the rib surrounds the opening portion.

3. The vehicle lamp according to claim 1, wherein the rib expands toward an inner surface of the wall surface portion.

4. The vehicle lamp according to claim 1, wherein a sectional shape of the rib is substantially a circular arc.

5. The vehicle lamp according to claim 1, wherein a height of the rib is not smaller than a thickness of the wall surface portion.

6. The vehicle lamp according to claim 1, wherein the wall surface portion includes a first wall surface portion located on a front side relative to a direction of releasing of a mold, and a second wall surface portion located in a rear side relative to the direction of releasing of the mold;

wherein the gate mark is formed in the first wall surface portion; and wherein the rib extends from the first wall surface portion to the second wall surface portion.

7. The vehicle lamp according to claim 6, wherein an opening portion is formed in the second wall surface portion.

8. A vehicle lamp comprising:

an injection-molded lamp body having a wall surface portion of substantially uniform thickness; and a gate mark and a rib extending along the wall surface portion from the gate mark, each formed in the wall surface portion of the lamp body, wherein the wall surface portion includes a first wall surface portion located on a front side relative to a direction of releasing of a mold, and a second wall surface portion located in a rear side relative to the direction of releasing of the mold, wherein the gate mark is formed in the first wall surface portion, wherein the rib extends from the first wall surface portion to the second wall surface portion, and wherein the gate mark is formed at a corner portion of the first wall surface portion on a second wall surface portion side.

9. A vehicle lamp, comprising:

an injection-molded lamp body having a wall surface portion of substantially uniform thickness; and a gate mark ans a rib extending along the wall surface portion from the gate mark, each formed in the wall surface portion of the lamp body, wherein an opening portion for attachment of a light bulb is formed in the wall surface portion, wherein an end portion of the rib surrounds the opening portion, wherein a height of the rib is not smaller than a thickness of the wall surface portion, wherein the wall surface portion includes a first wall surface portion located on a front side relative to a direction of releasing of a mold, and a second wall surface portion located in a rear side relative to the direction of releasing of the mold, wherein the gate mark is formed in the first wall surface portion, and wherein the rib extends from the first wall surface portion to the second wall surface portion.

10. The vehicle lamp according to claim 1, wherein the lamp body further includes:

a lens covering a front of the lamp body; and a first chamber and a second chamber being separated from each other by a portion of the lens and the wall surface portion.

11. The vehicle lamp according to claim 10, further including a first reflector in the first chamber and the second reflector in the second chamber.

12. The vehicle lamp according to claim 11, wherein the first and second reflectors are tiltably supported by the lamp body.

13. The vehicle lamp according to claim 10, wherein the first chamber is smaller than the second chamber.

14. The vehicle lamp according to claim 2, further including a reflector tiltably supported by the lamp body.

15. The vehicle lamp according to claim 8, further including a reflector tiltably supported by the lamp body.

16. The vehicle lamp according to claim 9, further including a reflector tiltably supported by the lamp body.

17. The vehicle lamp according to claim 1, further including a plurality of reflectors tiltably supported by the lamp body.

18. The vehicle lamp according to claim 1, wherein the wall surface portion includes a first opening and a second opening, and wherein the rib extends around the second opening.

19. A vehicle lamp comprising:

an injection-molded lamp body having a wall surface portion of substantially uniform thickness; and a gate mark and a rib extending along the wall surface portion from the gate mark, each formed in the wall surface portion of the lamp body, wherein the rib includes a column portion.

20. The vehicle lamp according to claim 19, further including a reflector tiltably supported by the lamp body.

* * * * *